United States Patent [19]

Stephens

[11] 3,796,213
[45] Mar. 12, 1974

[54] PERFUSION MONITOR
[76] Inventor: Frederick Richard Neason Stephens, 67 Coolawin Rd., Northbridge, N. S. W., Australia
[22] Filed: Sept. 10, 1971
[21] Appl. No.: 179,516

[30] Foreign Application Priority Data
Sept. 18, 1970 Australia.............................. 2587/70

[52] U.S. Cl......................... 128/2.05 R, 128/2.05 P
[51] Int. Cl............................................... A61b 5/02
[58] Field of Search... 128/2 L, 2 R, 2.05 A, 2.05 F, 128/2.05 M, 2.05 P, 2.05 Q, 2.05 R, 2.05 T, 2.05 V, 2.06 F

[56] References Cited
UNITED STATES PATENTS
3,227,155  1/1966  Erickson et al................ 128/2.05 R
3,087,488  4/1963  Streimer........................ 128/2.05 Q
3,228,391  1/1966  Fitter et al. .................... 128/2.05 T
3,269,386  8/1966  Sherman......................... 128/2.05 F
3,527,542  9/1970  Penhasi et al.................. 128/2.05 R
3,400,709  9/1968  Funfstuck ...................... 128/2.05 A
3,570,474  3/1971  Jonson ........................... 128/2.05 V
3,556,084  1/1971  Budde ............................ 128/2.05 P Primary Examiner—William E. Kamm
Attorney, Agent, or Firm—Stevens, Davis, Miller & Mosher

[57] ABSTRACT

A perfusion monitor for monitoring blood flow in a body. A transducer, associated with a part of the body, generates signals representing pulse wave forms. The signals are fed to a circuit which generates output signals corresponding to pulse rate and the area under the pulse curve. These latter signals are then multiplied and the result integrated. A signal proportional to the integrated result is then fed to a perfusion index meter which displays a reading of the blood flow.

8 Claims, 3 Drawing Figures

PERFUSION MONITOR

This invention relates to monitoring and/or diagnostic apparatus and more particularly to a calibrated tissue perfusion and heart rate monitor.

It is desirable, especially during the surveillance of patients under anaesthesia, or patients in any state which should require their being monitored, that a monitor should be able to integrate the parameters of pulse volume and pulse rate and so produce a more informative indication of blood flow at any selected point in a patient's body. The integration of these circulatory parameters is a basic object of the invention.

A further object of the invention is to permit assessments of circulatory changes which will be as informative as possible, including indicating changes of cardiac output or changes indicated by the equipment from causes acting at the periphery e.g. due to peripheral vascular disease or blockage of peripheral vessels.

The above and other objects are achieved, according to the invention, by means for measuring the area under a plethysmogram or pulse curve, means for sensing heart beating rate, means for integrating respective parameters proportional to said area and said pulse rate to produce a "perfusion factor", and output means adapted to display a reading proportional to said factor.

In one particular embodiment of the invention defined in the preceding paragraph said monitoring apparatus comprises an electronic system including a direct reading pulse rate meter, a blood pressure indicator, and a so-called "perfusion factor meter" having a calibrated scale. For convenience, a scale reading from 0 to 200 percent (with a central reading of 100 percent), has been chosen. Suitable switch gear and transducer outlets are adapted to be connected to a patient's body. All said components may be arranged on a display panel of a cabinet within which associated electronic circuits and power supplies are housed. The said tissue perfusion and heart rate monitor will couple to standard C.R.O. equipment for the auxiliary display of plethysmogram or pulse curves or E.C.G.

Figure 3:
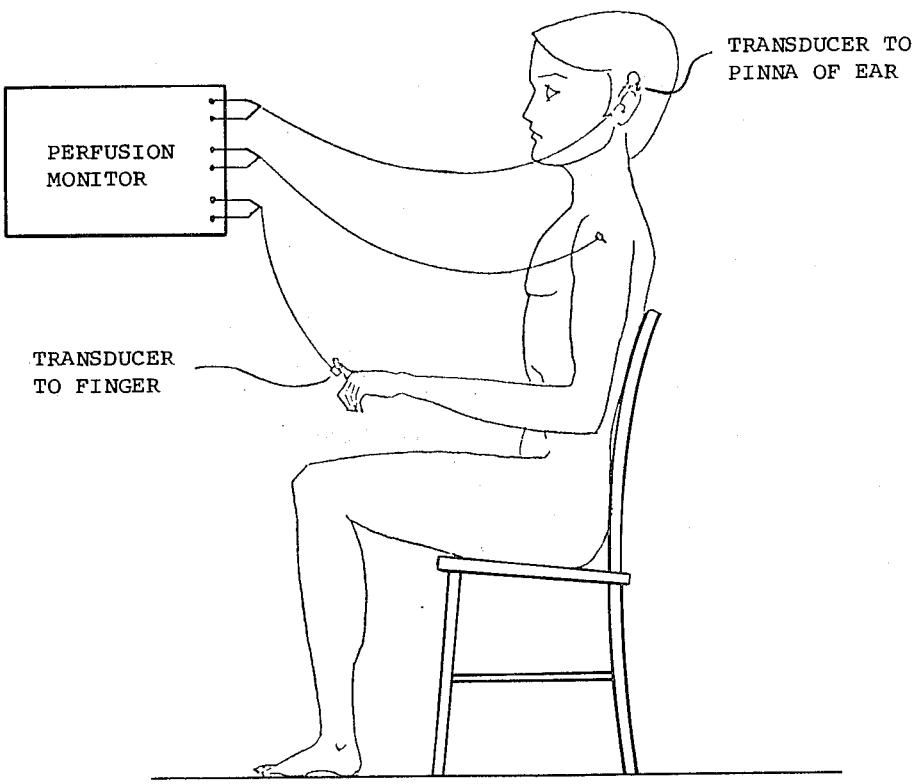

FIG. 3 discloses a plurality of sensors associated with pairs of separated points on a body.

Figure 1:
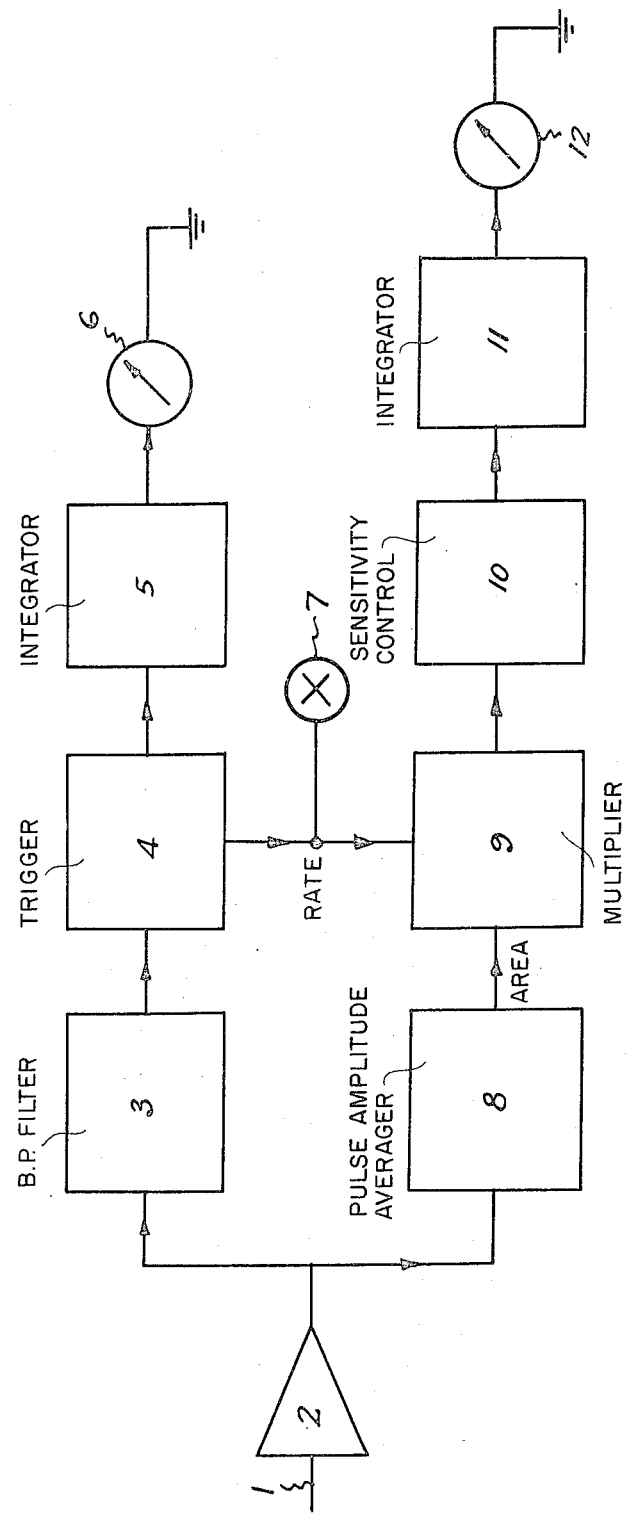
FIG. 1 is a schematic, block diagram of the present invention.

A preferred embodiment of the invention will now be described with reference to the accompanying schematic drawing of FIG. 1, which is a block diagram of a circuit which comprises an input 1 for pulse signals from said transducers (not shown) said signals being fed to an amplifier 2, the output of which is applied to a band-pass filter 3, and thence to a trigger circuit 4 and an integrator 5, the output of which passes to a rate meter 6 and then to earth. Said input pulse signal, in practice, is a reasonable replica of the pulse waveform under study. The pulse signal, after amplification, is fed to said filter for the purpose of reducing error due to patient movement and modifies the waveform to produce a reliable trigger signal for each pulse. Thus, the trigger signals are standardized before being fed to said integrator which averages the rate of occurrence of the triggers and drives the meter 6 showing the patient's pulse rate. The trigger signal are also used to drive the lamp 7 which lights momentarily with each pulse.

The amplified input signal is also fed from the amplifier 2 to a circuit which determines the average pulse amplitude. Thus, an output signal from the pulse amplitude measurer 8 is fed to the multiplier 9 together with an output signal from said trigger circuit 4. The multiplied output from the multiplier 9 is fed to the sensitivity control 10 and thence to another integrator 11 which averages the signal fed thereto and drives the perfusion factor meter 12.

It is known that the blood flow from the heart to the peripheral circulation system is a labile haemodynamic phenomenon in which, throughout circulation, at any given moment in time, the instantaneous pulse rate is a constant but in which the parameter of pulse volume may vary depending upon such local influences as arteriolar tone, changes in blood volume, tissue osmosis, the effects of ventilation, and so on. Thus, it is desirable to be able to derive information from the integration of a constant parameter with a parameter such as pulse volume which can be readily influenced by those variables whose value is determined by conditions which it is necessary to diagnose.

Said transducer outlets may, for example, comprise miniaturized lamps in combination with photoelectric cells, the output of which is dependent upon the intensity of light reflected by the blood within a translucent vascular connective tissue such as skin or subcutaneous fat. Alternatively, other types of transducers, such as those including suitable piezo-electric crystals, whose output is proportional to local variations in pressure, may be used, or transducer systems dependent on variations in tissue impedance may be used to actuate this equipment.

Figure 2:
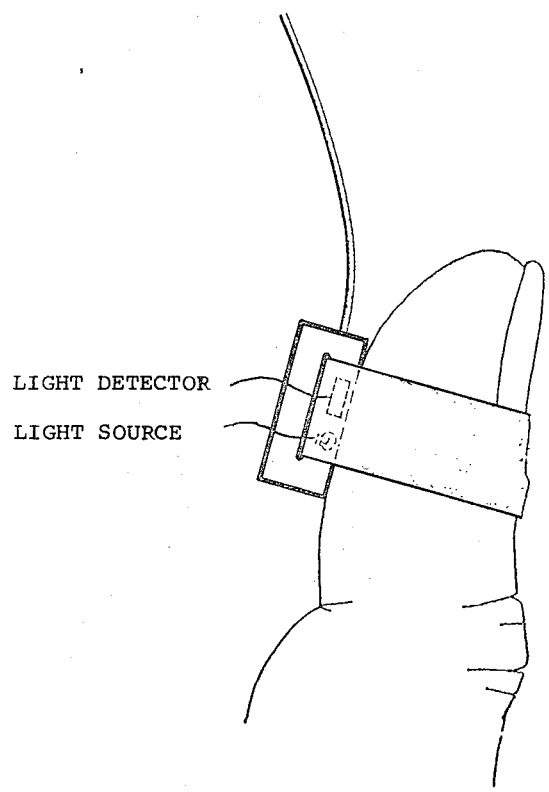
FIG. 2 illustrates a sensor used for monitoring blood flow in a part of a body.

In clinical use, said transducers are applied to a patient's body at some point selected for observation as shown in FIG. 2. The transducers are connected to the patient so as to provide direct readings of pulse rate, and perfusion factor and indirectly readings of blood pressure. The equipment may have its own oscilliscope or be coupled to an oscilloscope e.g., of a standard physiological monitor, to display plethysmograph tracings or auxiliary data, such as simultaneous electrocardiography.

At an appropriate time the perfusion factor meter 12 is usually initially adjusted as a basis for reference to read 100 percent and subsequent serial readings of said meter show quantitatively any relative variation in perfusion expressed as a percentage at the point or points on the body selected for observation. The reading observed on the "perfusion factor" meter is derived by electronically multiplying the area beneath the pulse curve, which represents an index of pulse volume, with the value of heart rate to produce an integrated dynamic factor referred to above as the perfusion factor. If desired, the said pulse curve may readily be observed on an oscilloscope screen to derive any information available from any anomalies in the shape of the said curve.

Alternatively, said transducers may be applied at pairs of widely separated points upon the patient's body, e.g., to a finger and to the pinna of an ear, whereby differential readings are fed to said apparatus and displayed upon the perfusion meter, as shown in FIG. 3.

Said differential readings may yield further significant detailed information. For instance, in compensatory vasoconstriction from blood loss, peripheral shutdown often appears to occur earlier at the digits than at the pinna of the ear. To illustrate still further, during hemorrhage and prior to fall in blood pressure or rise in pulse rate readings, the perfusion meter will fall steadily over a period of time as compensatory vasoconstriction gradually sets in. This specific phenomenon of fall in tissue perfusion can provide an extremely simple but good warning of impending effects from blood loss, as it occurs before significant variations in pulse rate or blood pressure readings.

While in many instances perfusion factors will rise or fall as the heart output pressure rises and falls, the reverse picture can however, present itself. For example, where there is peripheral vasoconstriction, especially in the absence of significant blood loss e.g., from the action of drugs which produce peripheral vasoconstriction, then under such circumstances one will frequently see considerable rise in arterial blood pressure and a concurrent fall in perfusion meter reading. Also, where peripheral vasodilatation has been produced due to direct local action on capillaries or due again to the action of drugs or to sympathetic blockade or fall in vasomotor tone, then in such states one can often see quite large increases in tissue perfusion index meter readings and yet perhaps a marked fall in arterial blood pressure, caused by the diminished peripheral resistance. In the respects just outlined the invention yields more detailed but valuable diagnostic information regarding physiological changes.

A further advantage of the invention is its ability to indicate directly the reflex effects on circulatory dynamics due to surgical stimulation, and thereby provide indication of risk of consciousness or "conscious recall" in a paralyzed patient otherwise erroneously thought to be unconscious. Within the limitations of the transducers themselves and those associated with peripheral vessel tone, the equipment has application for reading systolic and diastolic blood pressure. The readings are made from said calibrated meters and give quantitative instantaneous moment-to-moment indication of changes in circulatory dynamics.

I claim:

1. A perfusion monitor for monitoring blood flow in a body, comprising:
   a. means for obtaining a first signal corresponding to a pulse curve;
   b. means for determining pulse rate including means for generating a second signal for each pulse;
   c. means for measuring the area under the pulse curve including means for generating a third signal proportional to the area under the pulse curve;
   d. means for multiplying said second and third signals to produce a fourth signal;
   e. means for integrating said fourth signal to produce a perfusion index; and
   f. means for displaying a reading proportional to said index.

2. A perfusion monitor as claimed in claim 1 further including a direct reading pulse rate meter connected to said pulse rate determining means and wherein said display means includes a perfusion index meter.

3. A perfusion monitor as claimed in claim 1 wherein said means for obtaining includes at least one transducer adapted to be associated with a body.

4. A perfusion monitor as claimed in claim 3 wherein: obtaining includes an amplifier, connected to said transducer, for amplifying pulse signals from said transducer;
   b. said means for determining includes a band-pass filter, connected to said amplifier, for filtering unwanted noise from the amplified pulse signals, a trigger and monostable multivibrator circuit, comprising said second signal generating means, responsive to the output of said filter, a first integrator, connected to said filter through said circuit, for integrating the output of said filter and a pulse rate meter, responsive to the output of said first integrator, for indicating pulse rate;
   c. said means for measuring includes a pulse amplitude measurer, connected to said amplifier, for measuring the amplitude of the amplified pulse signals;
   d. said means for multiplying includes a multiplier, connected to said measurer and said circuit, for multiplying said second and third signals;
   e. a sensitivity control is connected to said multiplier;
   f. said means for integrating includes a second integrator, connected to said multiplier through said sensitivity control, for averaging said fourth signal; and
   g. said display means includes a perfusion index meter, responsive to the output of said second integrator, for indicating the flow of blood.

5. A perfusion monitor as claimed in claim 3 wherein said means for obtaining comprises:
   a. a light source whose light adapted to be directed to the translucent vascular connective tissue of a body; and
   b. a photoelectric cell responsive to the intensity of light reflected by blood within the connective tissue, said cell comprising said transducer.

6. A perfusion monitor as claimed in claim 3 comprising a plurality of transducers, said transducers being adapted to be associated at pairs of separated points upon the body whereby different readings may be fed to said display means.

7. A perfusion monitor as claimed in claim 6 wherein one transducer is adapted to be attached to a finger and another transducer is adapted to be attached to the pinna of the ear of a body.

8. A perfusion monitor as claimed in claim 1 wherein said display means includes a perfusion index meter having a central scale reading of 100 percent.

* * * * *